Feb. 14, 1961 I. L. YOUNG 2,971,265
ROTARY DRUM GRAIN DRYER
Filed March 31, 1958 3 Sheets-Sheet 1

INVENTOR:
Irvin L. Young
BY
Stevens Batcheler
Attorneys.

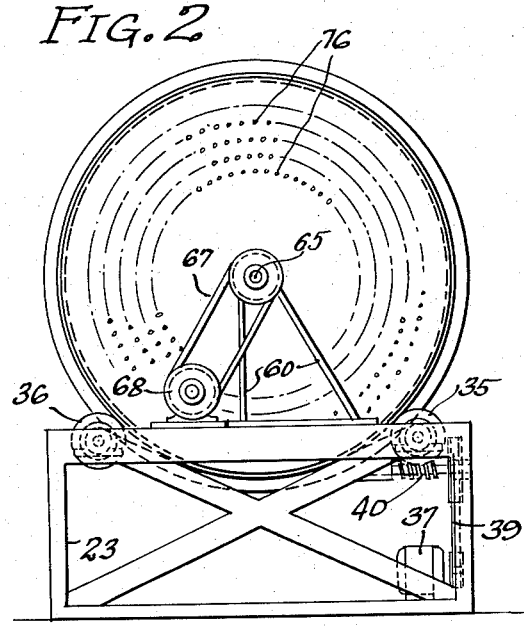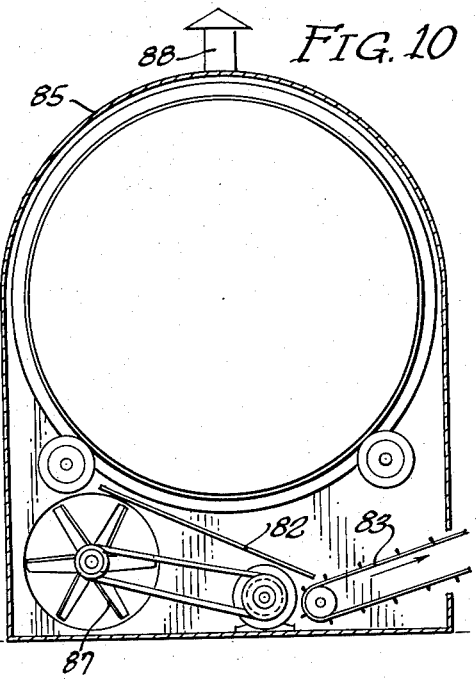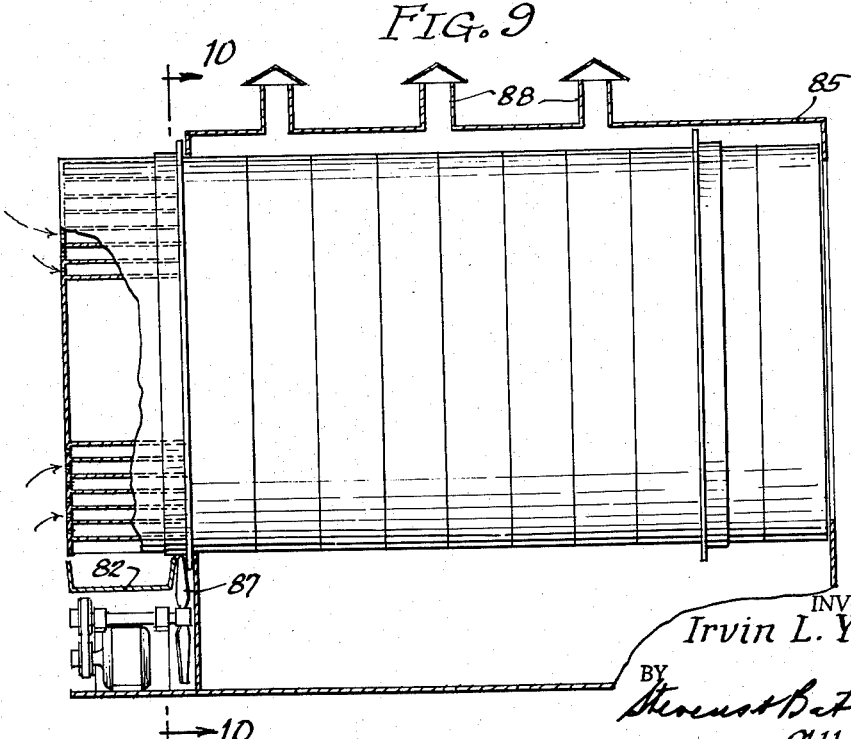

Feb. 14, 1961     I. L. YOUNG     2,971,265
ROTARY DRUM GRAIN DRYER
Filed March 31, 1958
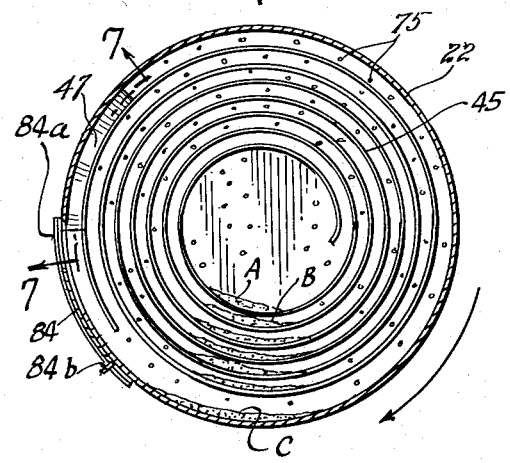
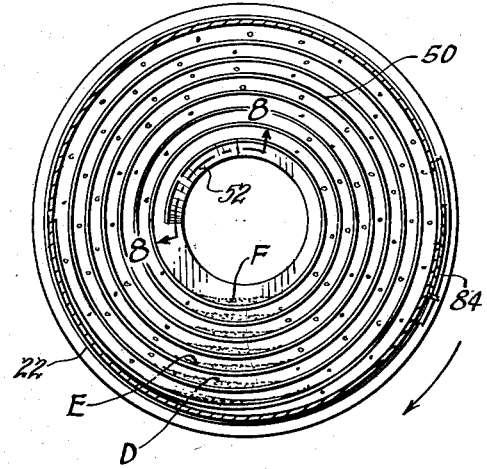
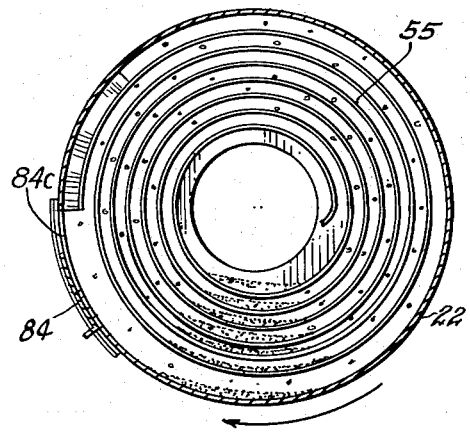
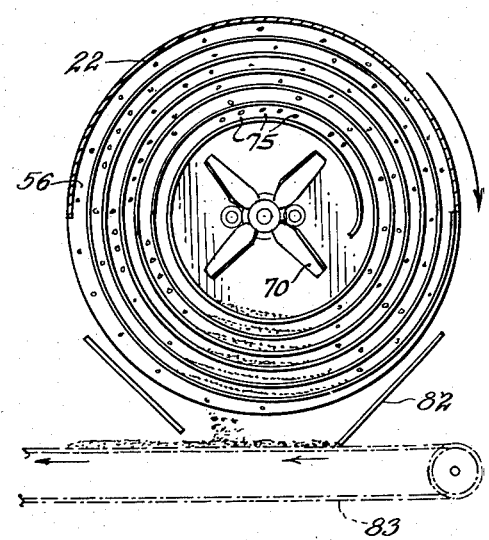
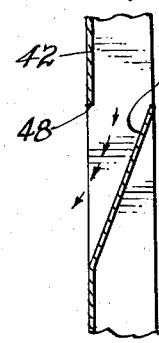
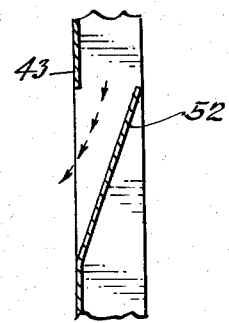
INVENTOR.
Irvin L. Young
BY
Stewart Batcheler
Attorneys.

United States Patent Office 2,971,265
Patented Feb. 14, 1961

2,971,265
ROTARY DRUM GRAIN DRYER

Irvin L. Young, Palmyra, Wis.

Filed Mar. 31, 1958, Ser. No. 725,318

3 Claims. (Cl. 34—137)

My invention relates to equipment for drying grain. When the grain is harvested, its moisture content is usually between 20% and 30%, and it is necessary to treat the grain in a manner to reduce its moisture content, so that the latter may run between 12% and 14%. Accordingly, it is one object of the present invention to provide an apparatus designed to keep the grain in motion while a current of warm air is passed through it, so that the grain has been divested of excess moisture by the time it leaves the apparatus.

A further object is to provide an environment for the grain in the form of a rotary drum with internal surfaces which are heated by a current of warm air and contact the grain while imposing a tumbling action on the same, so that the grain is not only warmed by such contact, but exposed throughout all of its surfaces to the warm air current for the dissipation of the moisture given off by the warming of the grain.

Another object is to construct the drying apparatus with channels designed to receive the grain and with convolutions which impart a maximum contacting area of channel walls with the grain while amounts thereof are contained in the channels.

An additional object is to arrange units of spirally-formed channels in consecutive order, with the spirals wound in opposite directions and means for the grain to pass from unit to unit, whereby to reverse the action of the dryer in respect to the grain as it passes from one unit to another.

A further object is to construct the apparatus with a series of spirally-formed slides which move in respect to grain deposited between them, the slides being in units arranged in consecutive order, and to provide for communication between the units in a manner to carry the grain outwardly in a given number of units and inwardly in a series of units alternating with the first mentioned ones.

An important object is to construct the dryer in drum form, and with warm and cool air facilities in one end, such facilities designed to project the air through units in the drum which contain the grain.

A better understanding of the invention may be gained by reference to the accompanying drawings, in which—

Fig. 2 is a view of the dryer as taken from the left hand end of Fig. 1;

Figure 1:
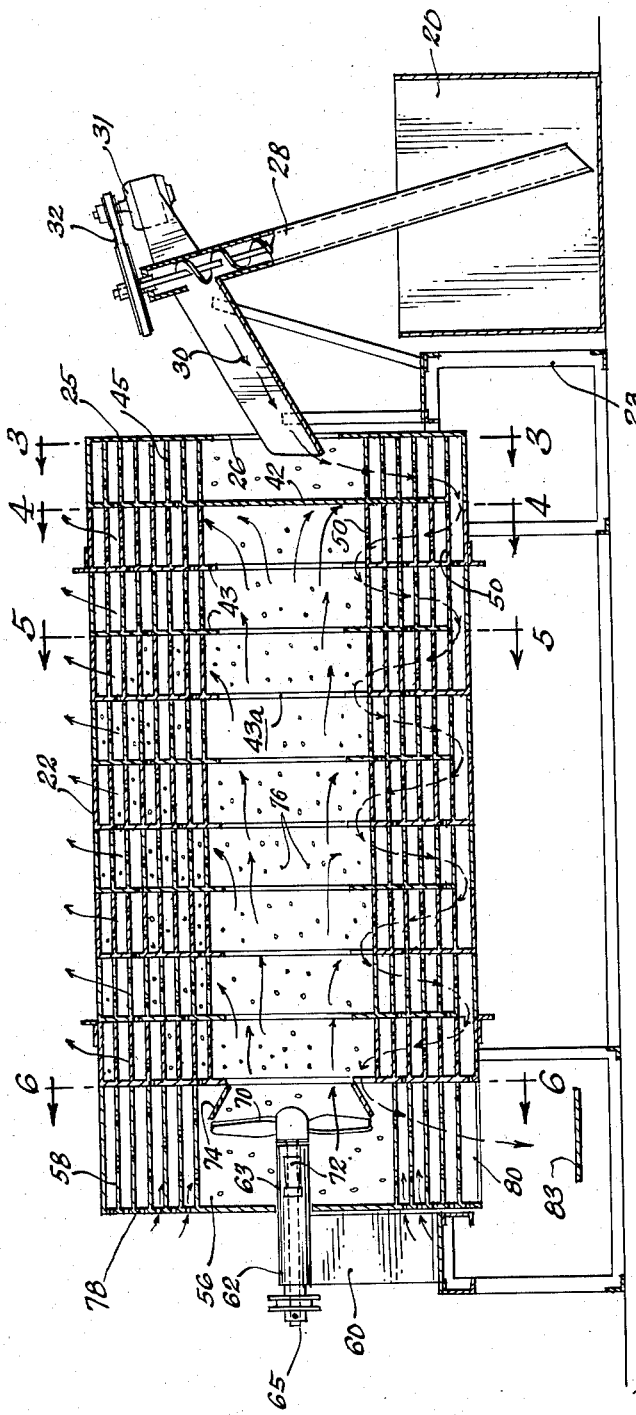
Fig. 1 is a longitudinal section through the dryer.

Figs. 3 to 6, respectively, sections on the lines 3—3 to 6—6 of Fig. 1;

Fig. 7 is an enlarged section on the line 7—7 of Fig. 3;

Fig. 8 is a similar section on the line 8—8 of Fig. 4;

Fig. 9 is a view similar to Fig. 1, showing a modification; and

Fig. 10 is a section on the line 10—10 of Fig. 9.

Referring specifically to the drawings, 20 denotes a storage receptacle in which the harvested grain is contained. The dryer is primarily in the form of a horizontal drum 22 positioned near the receptacle 20 and supported in elevated position by a frame 23.

The receiving end 25 of the drum 22 has a large central opening 26, and it is intended that grain from the receptacle 20 be transferred into the said opening. While any suitable means for this purpose may be employed, it is preferable to use the screw conveyor device 28 shown in Fig. 1 to elevate the grain from the receptacle 20 to an inclined chute 30 which enters the opening 26 as shown. The screw conveyor may be operated by an electric motor 31 and a belt drive 32; and the operation of the screw conveyor is regulated to deliver grain at a desired rate into the drum, according to the capacity of the latter.

Fig. 2 shows that the drum 22 is mounted between side rollers 35 and 36. In order to rotate the drum, a motor 37 is mounted in the bottom of the frame 23, with belt and worm drives 39 and 40 leading to the roller 35. Thus, the latter will drive the drum 22 by peripheral friction, while the roller 36 serves as a supporting idler.

Fig. 1 shows that the drum 22 contains a number of longitudinally-spaced partitions 42 and 43. The partition 42 is closed in the center while the partitions 43 have large central openings 43a similar to the opening 26 in the receiving end of the drum. It is primarily the function of the partitions 42 and 43 to separate the drum into a series of compartments; and the latter are provided with means for transferring the grain from compartment to compartment after it enters the receiving end of the drum.

As noted in Fig. 3, the major portion of the first drum compartment is occupied by a spiral member 45 designed to function as a slide and wound in counter-clockwise direction from the region of the opening 26 to a point near the periphery of the drum. When the drum is caused to rotate in the direction of the arcuate arrow in Fig. 3 and a supply of grain is fed into the drum, the grain first settles into a layer marked A. However, as the drum rotates, the layer will settle into the next convolution of the member 45 in the location B, and so on downwardly as the rotation of the drum continues. When the grain has reached the bottom of the drum as indicated at C, it meets an oblique deflector 47 shown in Fig. 7 which faces an opening 48 in partition 42; and the grain is thus swerved from its path in the first compartment of the drum to enter the second compartment thereof as indicated by arrows in Fig. 7.

Fig. 4 shows a slide 50 occurring in the second compartment of the drum. However, it is noted that the winding of the slide 50 is in the opposite direction from that of the slide 45. The effect of this construction as the drum continues in rotation is to raise the grain content of the compartment from the bottom to a higher level indicated at D, then to a still higher level indicated at E, and so on until the grain again occupies a position F in the central region of the drum. Figures 4 and 8 show a deflector 52 in this region directing the escape or transfer of the grain to the next compartment of the drum. Fig. 5 shows that the slide 55 in the said compartment is wound in the same direction as that in the first compartment (see Fig. 3), and it follows that the effect of this slide will be to again move the grain in downward direction, as in the first instance. Thus, the travel of the grain is reversed from compartment to compartment until the grain reaches the rearmost compartment of the drum, which is indicated at 56; and the winding of the slide 58 in this compartment is such as to bring the grain toward the bottom of the drum.

Figs. 1 and 2 show that a stand 60 is erected beyond the rear end of the drum for the suport of a bearing 62 which enters the compartment 56 as shown at 63. The bearing journals a shaft 65 which is operated by a belt drive 67 from a motor 68 mounted on the frame 23. The inner end of the shaft 65 carries a fan 70. Also, the bearing portion 63 is equipped with an electrical heating unit 72, which is schematically indicated in Fig. 1.

When the drum is in rotation, the fan 70 and heating unit 72 are also in operation, whereby to force a current of warm air into the center of the drum as indicated by arrows in Fig. 1, a tapered ring 74 being mounted in front of the fan to concentrate its current in the region mentioned.

Fig. 3 shows that the partitions of the drum are made with fine perforations 75, while Fig. 1 indicates that the convolutions of the slides 45, 50, etc., are also made with fine perforations 76. Or, the slides may be made of fine mesh screen material. The first incident in the treatment of the grain is the warming thereof by contact with the convolutions of the slides. These being of metal, it is understood that the warm air passing through their perforations from the center of the drum will cause the slides to become warmer than the temperature in the drum; and this warmth is therefore transmitted to the grain. During the rotation of the drum the convolutions of the slides will let the grain remain behind from the effect of gravity and serve to shift and tumble the grain with the result of exposing all its surfaces not only to the surface heat of the slides, but also to the warm air content of the drum compartments. With the employment of the plurality of convolutions in the slides, it will be evident that a continuous and extended drying will occur in each compartment of the drum; and the reversal of the slide travel from compartment to compartment will impart a returning effect on the grain each time it enters a compartment, serving to extend the drying action and procure the more intimate contact of heated surfaces or warm air with surfaces or particles of the grain, whereby to dry the grain to the required extent when it has reached the final compartment 56.

It is important not to deliver the dry grain while it is in a heated state, as contact with normal temperature in such event would harm the grain. It is therefore advisable to cool the grain gradually before it leaves the dryer, and this is done by making perforations 78 in the rear wall of the drum compartment 56 opposite the slide 58. These perforations will allow cool air to be drawn into outer regions of the drum by the action of the fan 70, so that the grain in such regions will be cooled before the grain leaves the drum by way of the bottom opening 80 in the compartment 56. A chute 82 is located under this opening for the loading of the dried grain to a conveyor 83 designed to transfer it to a suitable container (not shown).

Venting means are provided for the compartment of the drum in order to vary the temperature or air content therein. Thus, Figs. 3 to 5 show that the venting means comprise slides 84 located at the periphery of each compartment and traveling in guides 84a. The slides are closures for openings 84c in the periphery of the drum. A finger lug 84b is extended from each slide in order that the position of the latter may be varied.

Figs. 9 and 10 show a modification of the apparatus where the air blowing fan and heating units are below the drum. Thus, the latter is shown mounted in an enclosure 85 having a plenum chamber in the bottom with heating units contained therein. The fan assembly is shown at 87, and the air currents are projected into the plenum chamber to be warmed and to rise into the enclosure 85. With the walls in the drum perforated, the warm air will permeate through the drum and its contents to secure the desired effect on the grain; and the top of the enclosure 85 has a series of air vents 88. The modification is employed where it is not desirable or feasible to mount the fan assembly and heating unit in the end of the drum.

It will now be apparent that the novel dryer—whether in the main or modified form—comprises a compact apparatus in which the grain secures a maximum contact with metal and warm air in order to divest it of excess moisture. Further, the grain is treated in successive stages, with the slide action reversed from stage to stage, so that the grain is tumbled and agitated in opposite directions as it travels through the dryer. The efficiency of the apparatus is therefor high; and means are also provided for cooling the grain prior to delivery, so that no harm may come to it from exposure to temperate or cool air on the outside of the apparatus. Finally, it is apparent that the novel apparatus is an assembly of parts which are of a simple character and make for an economical installation.

While I have described the invention and its modification along specific lines, various further changes or refinements may be made therein without departing from its principle, and I reserve the right to employ all such changes and refinements as may come within the scope and spirit of the appended claims.

I claim:

1. An apparatus for drying grain comprising a drum having end walls, means journaling the drum for rotation on a substantially horizontal axis, one end wall having an opening in the region of the center to receive the grain, an imperforate partition forming a compartment inwardly of said end wall, a series of perforated partitions continuing after the first-mentioned one in the direction of the other end wall and forming further compartments, a perforated slide in each compartment in the form of a spiral centered on said axis, the winding direction of the slides being reversed from compartment to compartment and the perforated partitions having central openings therein and passages in the inner and outer portions for advancing the grain in outward and inward alternation during the rotation of the drum, deflectors extended from the partitions adjacent to the passages in the advancing direction, and second means operating in the center of the other end wall to direct a current of warm air through said central openings toward the first-named end wall, said other end wall having perforations remote from the center for said means to draw cool air from the exterior into the drum.

2. The structure of claim 1, the periphery of the drum having vents in the regions of the compartments.

3. The structure of claim 1, the periphery of the drum having openings in its periphery in the regions of the compartments, and closure slides for such openings.

References Cited in the file of this patent

UNITED STATES PATENTS

| 560,855 | Koneman | May 26, 1896 |
| 1,378,808 | Brownell | May 17, 1921 |

FOREIGN PATENTS

| 189,193 | Great Britain | Nov. 20, 1922 |
| 578,518 | Great Britain | July 2, 1946 |